US006802640B2

(12) United States Patent
Schubert et al.

(10) Patent No.: US 6,802,640 B2
(45) Date of Patent: Oct. 12, 2004

(54) STATIC MICROMIXER

(75) Inventors: Klaus Schubert, Karlsruhe (DE); Maximilian Fichtner, Oftersheim (DE); Georg Wiessmeier, Köln (DE); Stephan Ehlers, West Chester, PA (US); Klaus Elgeti, Bergisch-Gladbach (DE)

(73) Assignees: Forschungszentrum Karlsruhe GmbH, Karlsruhe (DE); Bayer AG, Leverkusen (DE)

( * ) Notice: Subject to any disclaimer, the term of this patent is extended or adjusted under 35 U.S.C. 154(b) by 201 days.

(21) Appl. No.: 10/016,815

(22) Filed: Dec. 13, 2001

(65) Prior Publication Data
US 2002/0057627 A1 May 16, 2002

Related U.S. Application Data

(63) Continuation-in-part of application No. PCT/EP00/05546, filed on Jun. 16, 2000.

(30) Foreign Application Priority Data
Jun. 19, 1999 (DE) .......................................... 199 28 123

(51) Int. Cl.[7] .................................................. B01F 5/06
(52) U.S. Cl. .................... 366/181.6; 366/337; 366/340; 366/341; 366/DIG. 1; 366/DIG. 3
(58) Field of Search ................................ 366/336, 337, 366/340, 338, 181.5, DIG. 1–DIG. 4, 341, 162.4, 181.6, 177.1; 138/37, 38, 40–42; 422/224, 225

(56) References Cited

U.S. PATENT DOCUMENTS

| | | | | |
|---|---|---|---|---|
| 4,971,450 A | * | 11/1990 | Gerich | 366/340 |
| 5,803,600 A | * | 9/1998 | Schubert et al. | 366/144 |
| 5,904,424 A | * | 5/1999 | Schwesinger et al. | 366/336 |
| 6,082,891 A | * | 7/2000 | Schubert et al. | 366/338 |
| 6,264,900 B1 | * | 7/2001 | Schubert et al. | 422/224 |
| 6,270,641 B1 | * | 8/2001 | Griffiths et al. | 204/451 |
| 6,299,657 B1 | * | 10/2001 | Schubert et al. | 48/197 FM |
| 6,321,998 B1 | * | 11/2001 | Schubert et al. | 239/8 |
| 6,368,871 B1 | * | 4/2002 | Christel et al. | 436/180 |
| 6,383,422 B1 | * | 5/2002 | Hoffschmidt | 264/44 |

FOREIGN PATENT DOCUMENTS

| | | |
|---|---|---|
| DE | 695 16 331 | 6/1995 |
| DE | 196 26 246 | 1/1998 |
| EP | 0 685 533 | 12/1995 |
| GB | 2 073 604 A * | 10/1981 |
| WO | WO 97 17130 | 5/1997 |

* cited by examiner

Primary Examiner—David Sorkin
(74) Attorney, Agent, or Firm—Klaus J. Bach

(57) ABSTRACT

In a static micromixer which comprises at least one mixing chamber and one guide component disposed upstream of the mixing chamber and which includes channels extending therethrough at an angle to the longitudinal axis of the micromixer, so that the channels of alternate layers intersect without communicating with each other, the cross-section of the channels decreases steadily from the entrance end to the exit end of the guide component so as to reduce the pressure losses of the fluid flowing through the channels for mixing in the mixing chamber.

8 Claims, 6 Drawing Sheets

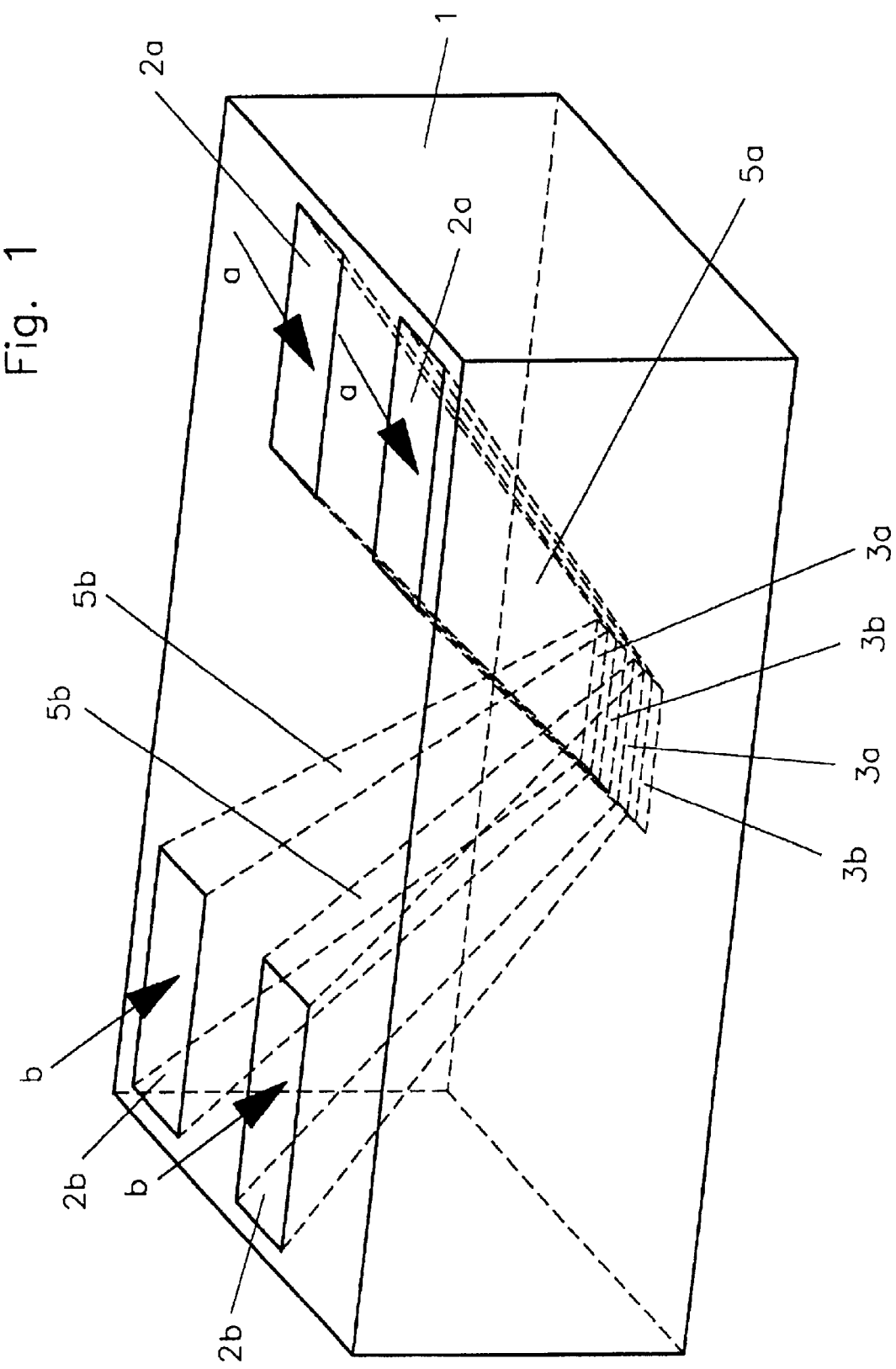

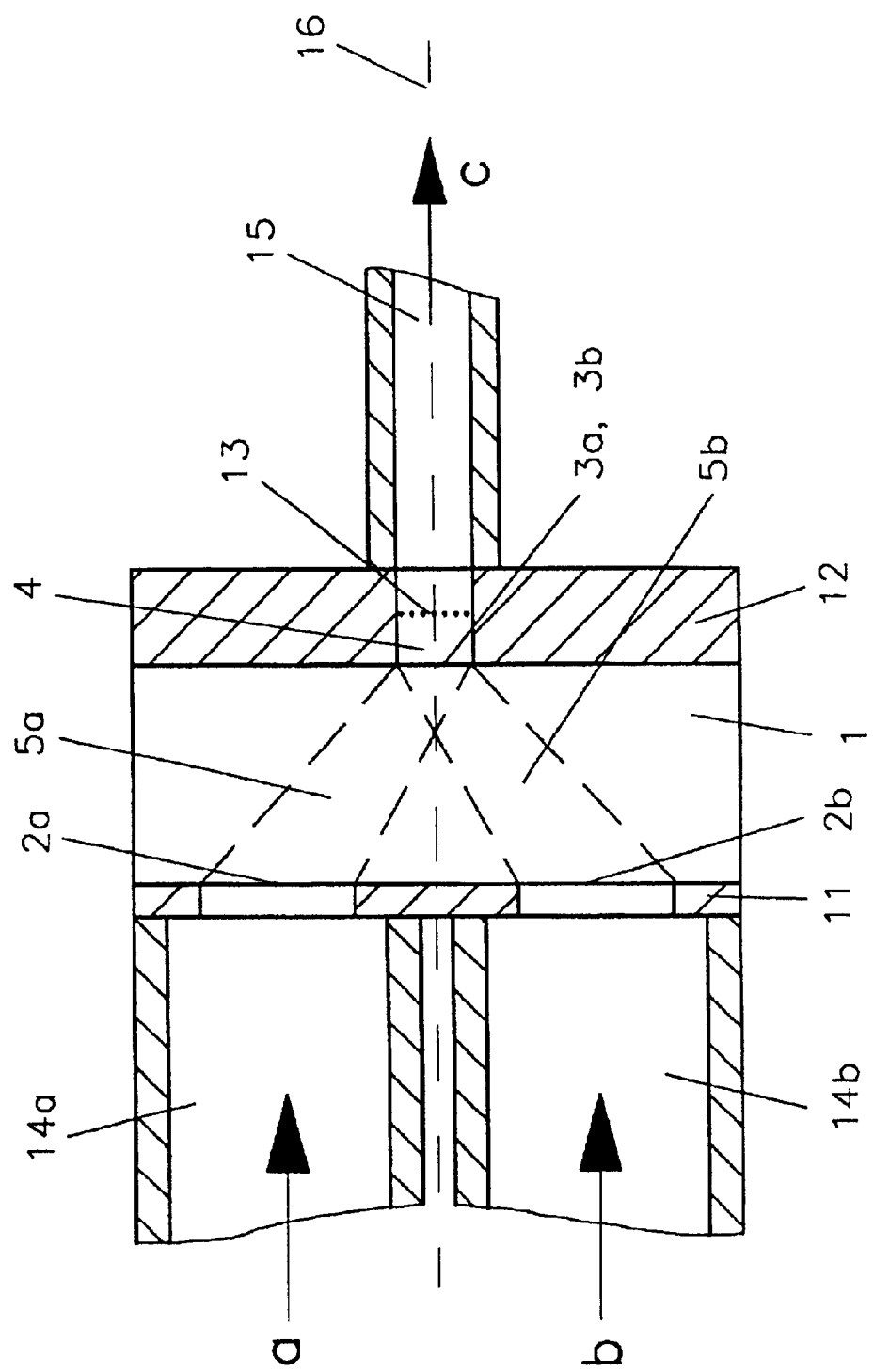

STATIC MICROMIXER

This is a Continuation-In-Part application of international application PCT/EP00/05546 filed Jun. 16, 2000 and claiming the priority of German application 199 28 123.8 filed Jun. 19, 1999.

BACKGROUND OF THE INVENTION

The invention relates to a static micromixer with a mixing chamber and a guide component which is arranged upstream of the mixing chamber for the separate admission to the mixing chamber of the fluids to be mixed or to be dispersed and through which slot-like channels extend at an angle with respect to the longitudinal axis of the micromixer.

DE 44 16 343 C2 discloses a micromixer including at least one mixing chamber and a guide component arranged upstream of the mixing chamber for the separate admission to a mixing chamber of fluids to be mixed, wherein the guide component has dimensions in the millimeter range and is composed of several superimposed foils of which each has a thickness of about 100 $\mu$m and which include microstructure-channels. The straight supply channels have a uniform cross-section and extend at an angle to the longitudinal axis of the micromixer wherein the channels of adjacent foils cross one another without communicating and extend to a common mixing chamber. The channels have a width, which is less than 250 $\mu$m and a height of about 70 $\mu$m. The thickness of the web between the channels is about 15 $\mu$m. The individual foils may be joined for example by diffusion welding to form a homogeneous vacuum tight and pressure tight microstructure body. A cover plate is disposed on the first and, respectively, the last foil.

A similar micromixer, which has curved parallel supply channels leading to the mixing chamber for two fluids to be mixed or dispersed but otherwise is of the same design and operating principle, is described in DE 195 40 292 C1. With this arrangement, a rapid mixing in the mixing chamber, which is also uniform over the whole flow cross-section, is to be achieved. The guide channels have a uniform cross-section with widths of less than 250 $\mu$m; the foils into which the channel structures are formed, have a thickness of about 100 $\mu$m.

Another possibility to optimize the mixing process is disclosed in WO 97/17130. By a combination of individual channels to form a slot-like channel per foil, the micromixer achieves, by the elimination of the webs between the individual channels, a more advantageous ratio of volume flow to channel wall surface area and, consequently, a reduction of the friction losses in guide component.

It is the object of the present invention to provide, on the basis of the last mentioned state of the art, a guide component for the admission of the fluids to be mixed to the mixing chamber of a static mixer of the type as described, whereby the pressure losses of the fluids in the guide component between the inlet and the common outlet side are further reduced. At the same time, an at least equal or possibly improved mixing quality (effectiveness of the mixing process) should be achieved.

SUMMARY OF THE INVENTION

In a static micromixer which comprises at least one mixing chamber and one guide component disposed upstream of the mixing chamber and which includes channels extending therethrough at an angle to the longitudinal axis of the micromixer, so that the channels of alternate layers intersect without communicating with each other, the cross-section of the channels decreases steadily from the entrance end to the exit end of the guide component so as to reduce the pressure losses of the fluid flowing through the channels for mixing in the mixing chamber.

The individual admission channels extend from the at least two fluid supply chambers at an angle to the longitudinal axis of the micromixer. Channels of adjacent layers which contain fluids from different supply chambers, intersect without communication and lead to the mixing chamber by way of a common cross-sectional discharge area. The openings of the slot-like channels are disposed on top of one another in an aligned fashion. With the introduction of a second mixing stage in the mixing chamber in the form of a structure which divides the flow (for example, a grid), the turbulence in the mixing chamber and the mixing effect are increased.

With an increased channel flow cross-section at the entrance end of the channels, the flow speed of the fluid flowing therein is relatively low with an equal volume flow. With the greater channel cross-section and the lower flow speed, the friction lost in the fluids between the entrance and the exit area of the guide component is reduced. Also, with the locally wider channels, the chances of the channels becoming clogged are reduced.

An embodiment of the micromixer according to the invention as well as a method of manufacturing the same will be described below on the basis of the accompanying drawings:

BRIEF DESCRIPTION OF THE DRAWINGS

FIG. 1 shows the guide component of the micromixer in a perspective view and greatly enlarged to show the principle, FIG. 4 shows the micromixer with the guide component, the mixing chamber and the inlet and outlet components. Additionally, a grid is arranged in the fluid flow downstream of the channel exit side.

DESCRIPTION OF PREFERRED EMBODIMENTS

In accordance with FIGS. 1 to 4, the guide component consists of metal, plastic or ceramics. The flow direction of the individual fluid flows a and b is from the channel inlet sides 2a and 2b to the channel outlet side 3a and 3b, which open into a common mixing chamber 4 and form the common fluid flow C. The channels 5a and 5b have, at the exit end of the embodiment, which was used for generating the data for the measurement curve represented in FIG. 6, a height of about 150 $\mu$m with a slot width of 9 mm. At the entrance side, the channels have a height of about 1.5 mm and a slot width of about 11 mm. The wall thickness between two channels is at the exit side about 150 $\mu$m.

Figure 2A:
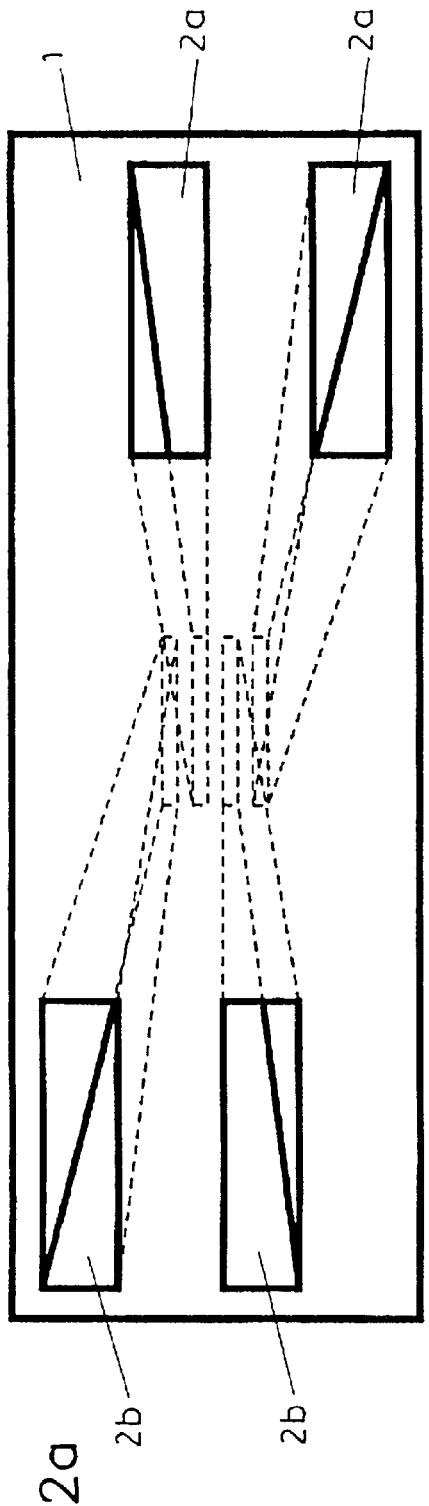
FIG. 2 is a schematic top view of the guide component showing the channel inlet side (FIG. 2a) and the channel outlet side (FIG. 2b)
Figure 2B:
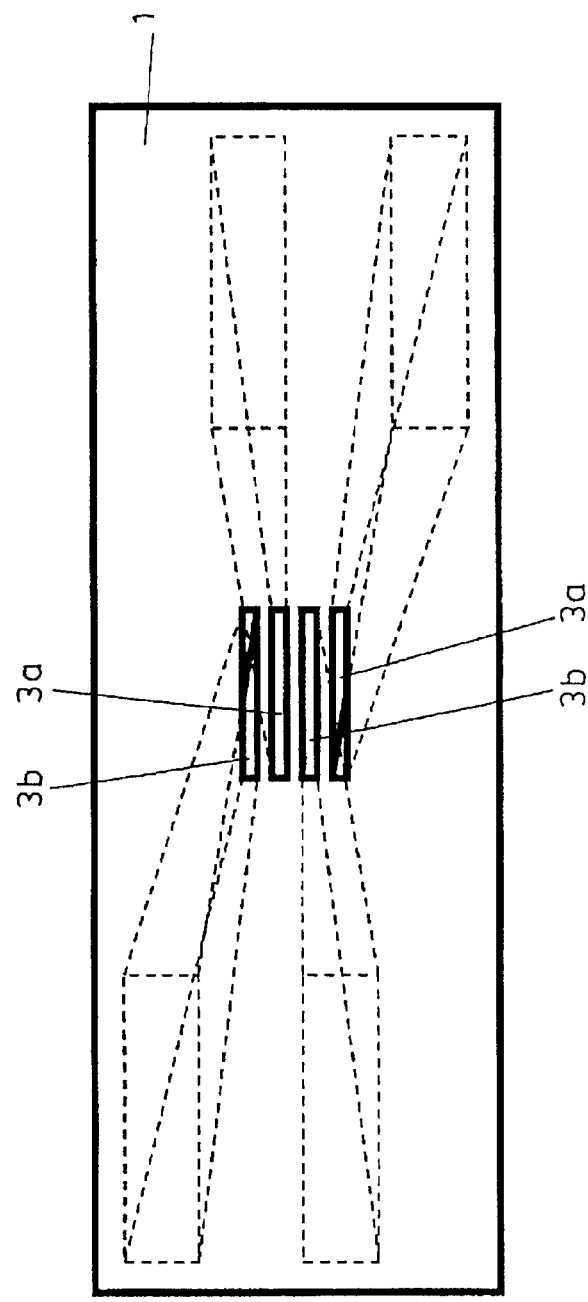
Figure 3A:
FIGS. 3a, 3b and 3c show three examples for three different embodiments of a channel exit side which is provided with guide webs oriented in flow direction.
Figure 3B:
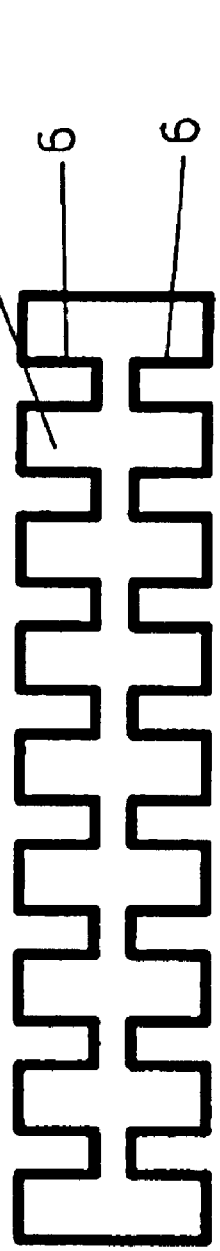
Figure 3C:
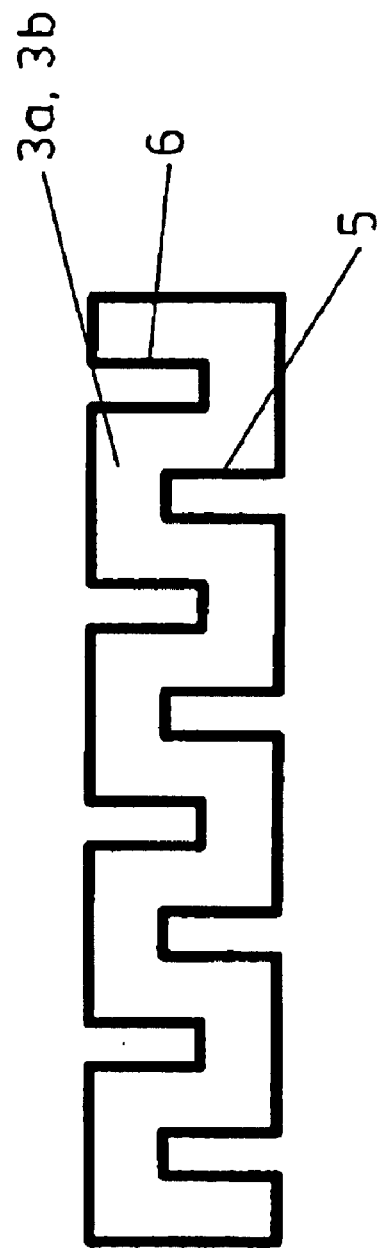

For accurate guidance of the flow of the fluids a and b at the channel exit sides 3a and 3b, the channels may be provided with webs 6, which are oriented in the flow direction of the fluids (arrow a and b). FIGS. 3a, 3b and 3c show three different arrangements for these guide webs at the channel exit side. Furthermore, as shown in connection with the complete micromixer arrangement represented in FIG. 4, the mixing chamber 4 may include a structure dividing the flow for example in the form of a grid 13.

Figure 5:
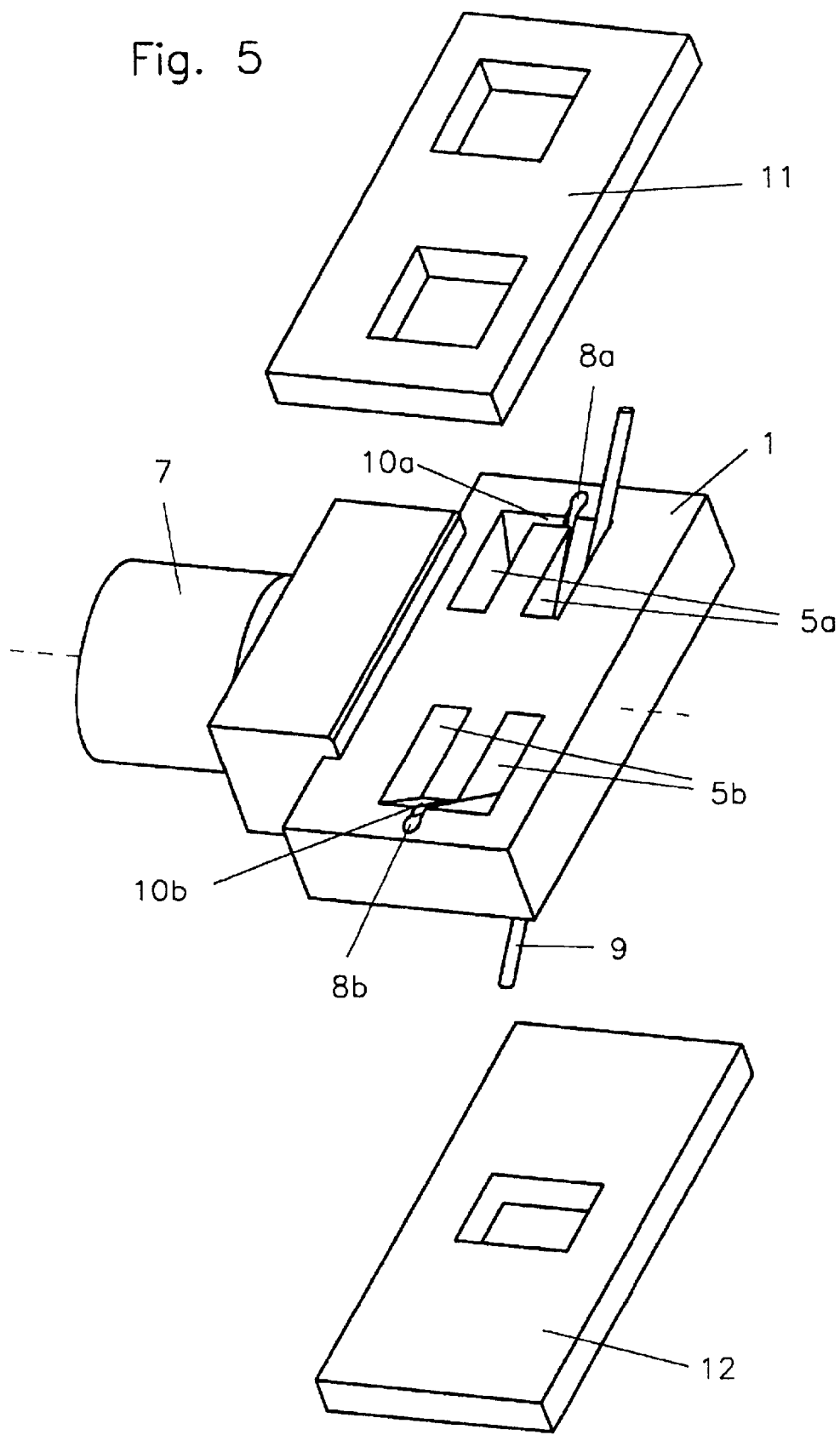
FIG. 5 shows a particular method of manufacturing the guide component.

If the guide component consists of metal or an electrically conductive ceramic material, guide component can be manufactured, as shown in FIG. 5 by way of wire erosion with only one cut per fluid flow a and respectively, b. For this manufacturing process, an electrically conductive and freely pivotable clamping arrangement 7 is to be provided for the guide component 1. To this end, for each channel group 5a or, respectively, 5b of a fluid flow, a bore 8a or, respectively, 8b is to be provided as starting point for the wire erosion process. The wire 9 is inserted in such a bore. For later utilization, the bores 8a and 8b as well as the auxiliary cuts 10a and, respectively, 10b provided at the inlet and outlet sides must each be covered by a plate 11 and 12, respectively, wherein the channel entrance areas 2a and 2b and the channel exit areas 3a and 3b remain uncovered.

For a comparative judgement of the mixing efficiency of different micromixer types a testing procedure was used with an azo coupling reaction of 1- and 2-napthol (compound x or, respectively, x') with 4-sulfonic acid benzene diazonium salt (compound y). The reaction is a parallel reaction with the reaction scheme as represented below.

The second product Q can be analyzed in a simple manner with the aid of absorption spectra. The efficiency of the mixing process is judged by the selectivity X(Q) of the product Q: If the mixing of all the materials x, x' and y in a mixing chamber is immediate and complete a value of 0.1 is obtained for the selectivity X(Q) at the selected concentration ratios. The more product Q is formed at the expense of the product R the worse is the mixing efficiency.

The selectivity X(Q) [–] of the product Q plotted over the average total-energy density E.

$$E = \Delta p_1 \cdot (V_1/V_{ges}) + \Delta p_2 \cdot (V_2/V_{ges}) [J/m^3]$$

Figure 6:
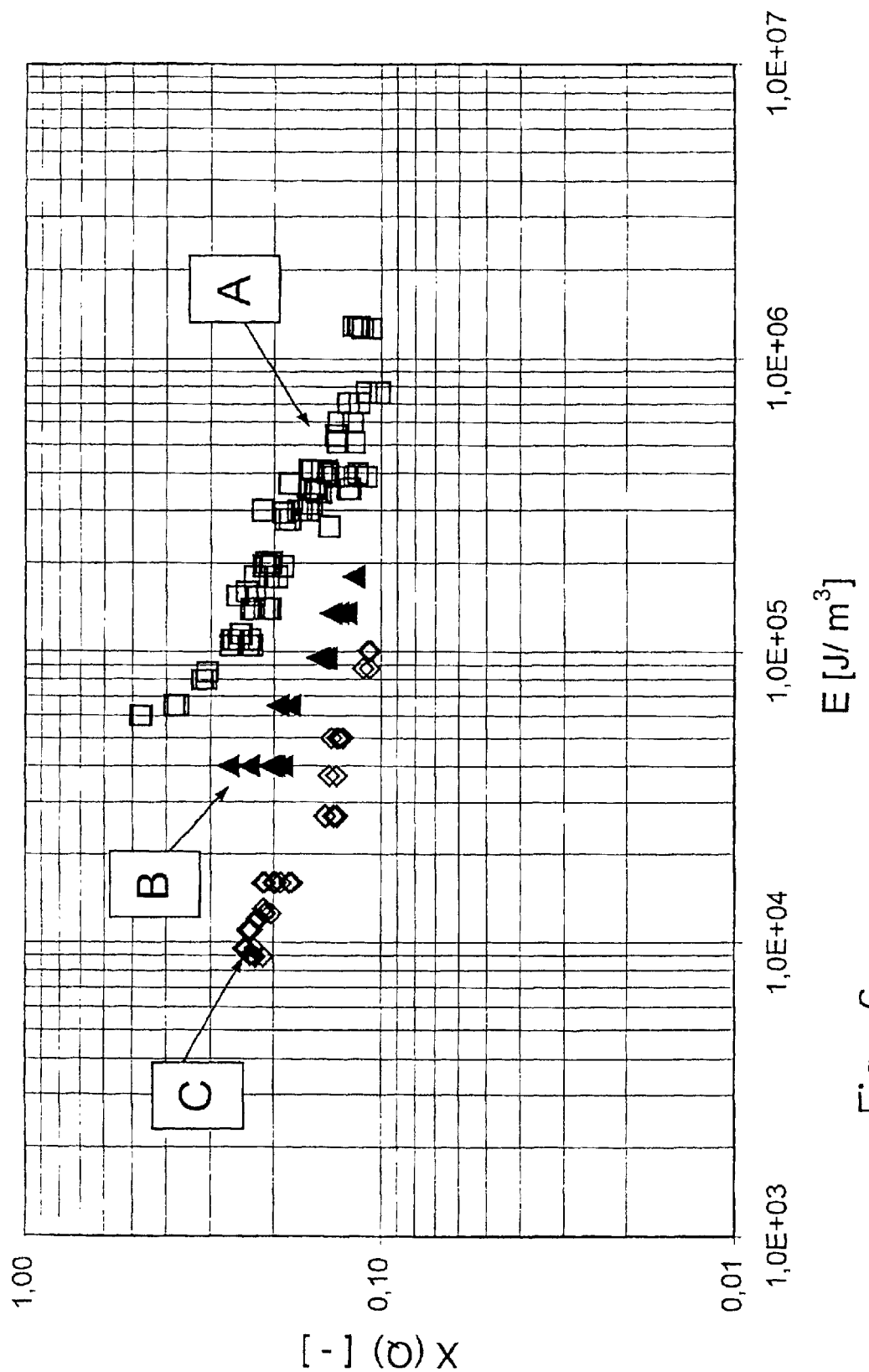
FIG. 6 shows in a diagram the product selectivity X(Q)[−] of the product Q of the test reaction used for the determination of the mixing efficiency of the micromixer in comparison with a prior art micromixer design plotted over the average total energy density E[J/m$^3$].

(pi=the pressure loss of the passage i, $V_i$=the volume flow of the passage i, $V_{ges}$ =total volume flow) is plotted in FIG. 6 for the micromixer according to the invention with and without downstream grid 13 (set of points B or, respectively, C) in comparison with the micromixer of DE 44 46 343 C2. A micromixer with high efficiency has, at one hand, a low pressure loss, which is a measure for the energy consumption or, respectively, the total energy density in the mixing process and, on the other hand, a low selectivity X(Q) of the product Q. It is clearly apparent that a certain selectivity X(Q) or, respectively, a certain mixing efficiency of the micromixer according to the invention is achieved already at a substantially lower total energy density E than with the prior art micromixer concept.

The efficiency of the mixing process can further be increased if a grid 13 is provided downstream of the exit side of the guide component through which the fluid flows. This modification is shown in FIG. 4 for the arrangement of the complete micromixer. The grid 13 installed therein has a mesh width of about 200 μm and is disposed in the mixing chamber 4 at a distance of about 1000 μm from the channel exit sides 3a, 3b of the guide component 1. Furthermore, the supply lines 14a and 14b, the fluid flows a and b as well as the outlet line 15 are shown in FIG. 4.

What is claimed is:

1. A static micromixer with at least one mixing chamber (4) and an upstream guide component (1) for the separate admission of two different fluids (a, b) to be mixed or too be dispersed, said guide component (1) including for each of said fluid flows at least two slot-like flat channels (5a, 5b) extending at an angle with respect to, and from opposite sides of a plane extending along a longitudinal axis (16) of the micromixer such that said channels intersect each other in mutually spaced relationship and in an alternating fashion at an exit area to said mixing chamber (4), where they form a common exit cross-section of alternatingly arranged outlets of said slot-like channels for said different fluids (a, b), with webs disposed between adjacent outlets at the exit cross-section (3a, 3b) the height of the webs being less than 500 μm, said chactaeis in said guide component having, for at least a part of the fluid flows to be mixed, a cross-section which decreases from the channel inlet sides continuously toward and up to the channel exit area.

2. A micromixer according to claim 1, wherein said slot-like channels are provided over at least part of their length with webs oriented in flow direction.

3. A micromixer according to claim 1, wherein, in the direction of the flow, behind the exit area of the guide component, a grid, or a net is provided.

4. A micromixer according to the claim 1, wherein said channels of the guide component are each formed individually into an electrically conductive base body by wire erosion, wherein the channels for each fluid flow are formed into the base body in the form of a ridge section and auxiliary cuts which have been provided to facilitate the forming of the channels and which interconnect the channels are covered at the channel entrance sides and also at the channel exit aides by a plate.

5. A micromixer according to claim 1, wherein the guide component is manufactured by layered laser welding of metal powder, wherein the channel areas are not melted and are formed by subsequent removal of the powder which has not been melted.

6. A micromixer according to claim 1, wherein the guide component is manufactured from a plastic material by layered hardening of the plastic material by means of a laser stereo Lithography procedure, wherein the channel areas are not exposed to light and therefore are not hardened and are formed by subsequent removal of the non-exposed and non-hardened plastic material.

7. A micromixer according to claim 1, wherein the guide component is manufactured by layered laser sintering of ceramic powder, wherein the channel areas are not sintered and the channels are formed by subsequent removal of the nonsintered ceramic powder.

8. A micromixer according to claim 1, wherein the height of said webs is less than 150 μm.

* * * * *